(12) United States Patent
Kilper et al.

(10) Patent No.: US 10,158,447 B2
(45) Date of Patent: Dec. 18, 2018

(54) RESILIENT OPTICAL NETWORKING

(71) Applicants: The Arizona Board of Regents on Behalf of the University of Arizona, Tucson, AZ (US); The Trustees of Columbia University in the City of New York, New York, NY (US)

(72) Inventors: Daniel Kilper, Tucson, AZ (US); Keren Bergman, New York, NY (US); Gil Zussman, New York, NY (US); Berk Birand, New York, NY (US)

(73) Assignees: THE ARIZONA BOARD OF REGENTS ON BEHALF OF THE UNIVERSITY OF ARIZONA, Tucson, AZ (US); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 15/510,772

(22) PCT Filed: Sep. 11, 2015

(86) PCT No.: PCT/IB2015/001999
§ 371 (c)(1),
(2) Date: Mar. 13, 2017

(87) PCT Pub. No.: WO2016/038463
PCT Pub. Date: Mar. 17, 2016

(65) Prior Publication Data
US 2017/0279557 A1    Sep. 28, 2017

Related U.S. Application Data

(60) Provisional application No. 62/048,818, filed on Sep. 11, 2014.

(51) Int. Cl.
*H04B 10/00* (2013.01)
*H04J 14/02* (2006.01)
(Continued)

(52) U.S. Cl.
CPC ...... *H04J 14/0212* (2013.01); *H04B 10/0795* (2013.01); *H04B 10/11* (2013.01);
(Continued)

(58) Field of Classification Search
USPC .................................................. 398/1–8
See application file for complete search history.

(56) References Cited

U.S. PATENT DOCUMENTS 5,986,783 A * 11/1999 Sharma ............... H04J 14/0283
398/1
6,317,233 B1   11/2001 Son
(Continued)

FOREIGN PATENT DOCUMENTS

CN      1275277 A      11/2000
CN    100459512 C       2/2009
(Continued)

OTHER PUBLICATIONS

Author Unknown, "ROADM en las Redes de Nueva Generación" Published Aug. 24, 2011 at https://filotecnologa.wordpress.com/2011/08/24/roadm-en-las-redes-de-nueva-generacion/, 4 pages and machine translation of the 1st paragraph in English.
(Continued)

*Primary Examiner* — Agustin Bello
(74) *Attorney, Agent, or Firm* — Mayer & Williams, PC; Stuart H. Mayer

(57) ABSTRACT

An optical communication system includes a plurality of optical system nodes, a plurality of optical space switches and a plurality of optical fibers. The plurality of optical system nodes each includes at least one reconfigurable
(Continued)

optical add/drop multiplexer (ROADM). The optical system nodes each have at least one client side port and at least one line side port. Each optical space switch is operatively coupled to the line side port of one of the plurality of optical system nodes. Each of the optical fibers couples one of the optical space switches to another of the optical space switches.

38 Claims, 10 Drawing Sheets

(51) Int. Cl.
*H04B 10/079* (2013.01)
*H04B 10/11* (2013.01)
*H04Q 11/00* (2006.01)

(52) U.S. Cl.
CPC ...... *H04J 14/0221* (2013.01); *H04J 14/0242* (2013.01); *H04J 14/0291* (2013.01); *H04Q 11/0005* (2013.01); *H04Q 2011/0016* (2013.01)

(56) References Cited

U.S. PATENT DOCUMENTS

| | | | | |
|---|---|---|---|---|
| 6,366,716 | B1* | 4/2002 | Graves | H04Q 11/0005 359/341.1 |
| 6,480,309 | B1 | 11/2002 | Lee | |
| 6,507,421 | B1* | 1/2003 | Bishop | H04Q 11/0005 385/17 |
| 6,542,268 | B1* | 4/2003 | Rotolo | H04J 14/0204 369/44.23 |
| 6,798,941 | B2 | 9/2004 | Smith et al. | |
| 6,839,514 | B1* | 1/2005 | Sharma | H04J 14/0283 398/2 |
| 7,606,494 | B1* | 10/2009 | Weston-Dawkes | H04J 14/0212 398/48 |
| 7,680,032 | B1* | 3/2010 | Pheiffer | H04J 3/085 370/222 |
| 8,131,149 | B2* | 3/2012 | Zottmann | H04J 14/0204 398/45 |
| 8,200,084 | B2 | 6/2012 | Bernstein | |
| 8,553,534 | B2* | 10/2013 | Allasia | H04L 12/433 370/216 |
| 2002/0063918 | A1* | 5/2002 | Kaiser | H04Q 11/0001 398/55 |
| 2003/0128978 | A1* | 7/2003 | Hemenway | H04J 14/0283 398/2 |
| 2005/0089027 | A1 | 4/2005 | Colton | |
| 2005/0226210 | A1* | 10/2005 | Martin | H04J 14/0227 370/351 |
| 2009/0041457 | A1* | 2/2009 | Maki | H04J 14/0204 398/45 |
| 2010/0111520 | A1* | 5/2010 | Way | H04B 10/27 398/3 |
| 2010/0239247 | A1* | 9/2010 | Kani | H04J 14/0282 398/41 |
| 2011/0076013 | A1* | 3/2011 | Valvo | H04B 10/07 398/30 |
| 2011/0123195 | A1* | 5/2011 | Frigo | H04J 14/0227 398/59 |
| 2011/0262142 | A1 | 10/2011 | Archambault | |
| 2012/0183294 | A1* | 7/2012 | Boertjes | H04J 14/0204 398/49 |
| 2015/0093110 | A1* | 4/2015 | O'Byrne | H04Q 11/0005 398/48 |
| 2017/0279557 | A1* | 9/2017 | Kilper | H04J 14/0212 |

FOREIGN PATENT DOCUMENTS

| | | |
|---|---|---|
| EP | 2461629 A1 | 6/2012 |
| WO | 98/47039 | 10/1998 |
| WO | 02/069104 A2 | 9/2002 |
| WO | 2003/084131 A | 10/2003 |

OTHER PUBLICATIONS

Arouxet, Maria Belen. "Metodos Computacionales De Optimizacion Sin De Riva Das y Para Minimizacion Con Restricciones". Universidad 33 Nacional de La Plata. 2013. Link: http://sedici.un!p.edu.ar/bit~tream/handle/10~1§I4447JID2cument2 c2mglet2.pdf?seguence=J and machine translation of the introduction in English.

* cited by examiner

RESILIENT OPTICAL NETWORKING

CROSS REFERENCE TO RELATED APPLICATION

This application is a National Phase in the United States of PCT/IB2015/001999, filed Sep. 11, 2015, which claims the benefit and priority to U.S. Provisional Application Ser. No. 62/048,818, filed Sep. 11, 2014, entitled "Resilient Metro Optical Networking" which is incorporated herein by reference in its entirety.

This invention was made with government support under Grant No. EEC0812072 awarded by NSF. The government has certain rights in the invention.

BACKGROUND

Commercial optical communication systems employ highly dynamic and configurable electronic switching that runs on top of largely static high capacity optical systems. This architecture has worked well in the past since typical data traffic flows were on the order of 10-100 Mb/s while the capacity of an optical channel is 10-100 Gb/s. As traffic demand increased, the size of application traffic flows increased and the way that the Internet is used has changed. Data flows in the Gigabit/second range are more frequently used or desirable. Moreover, trends such as big data, which involves manipulating, backing up and transporting large sets of data, networks on demand, enterprise data centers and storage networks, video on demand, and scientific computing all break the conventional static optical network model. Accordingly, there is a growing need for dynamic and highly configurable capabilities in the optical layer of metro and other networks. Furthermore, events such as natural disasters and electrical power outages create dramatic changes that also call for an adaptive and thereby resilient optical network infrastructure that would mitigate their impacts.

SUMMARY

Described herein is an optical communication system that has dynamic and highly reconfigurable optical network capabilities. In accordance with one aspect of the invention, an optical space switch is introduced on the fiber plant or line side of the network at each network node. The optical space switches allow the fiber connections between nodes to be reconfigured while also allowing the underlying optical systems to perform optical protection and restoration as usual. Moreover, such optical protection and restoration by the underlying optical systems may be performed entirely independent of this fiber plant or line side switching. Furthermore optical power controls, monitors and optical amplifiers may be used to adjust the gain on the optical fibers in order to achieve the aggregate power levels required for stable operation.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Figure 1:
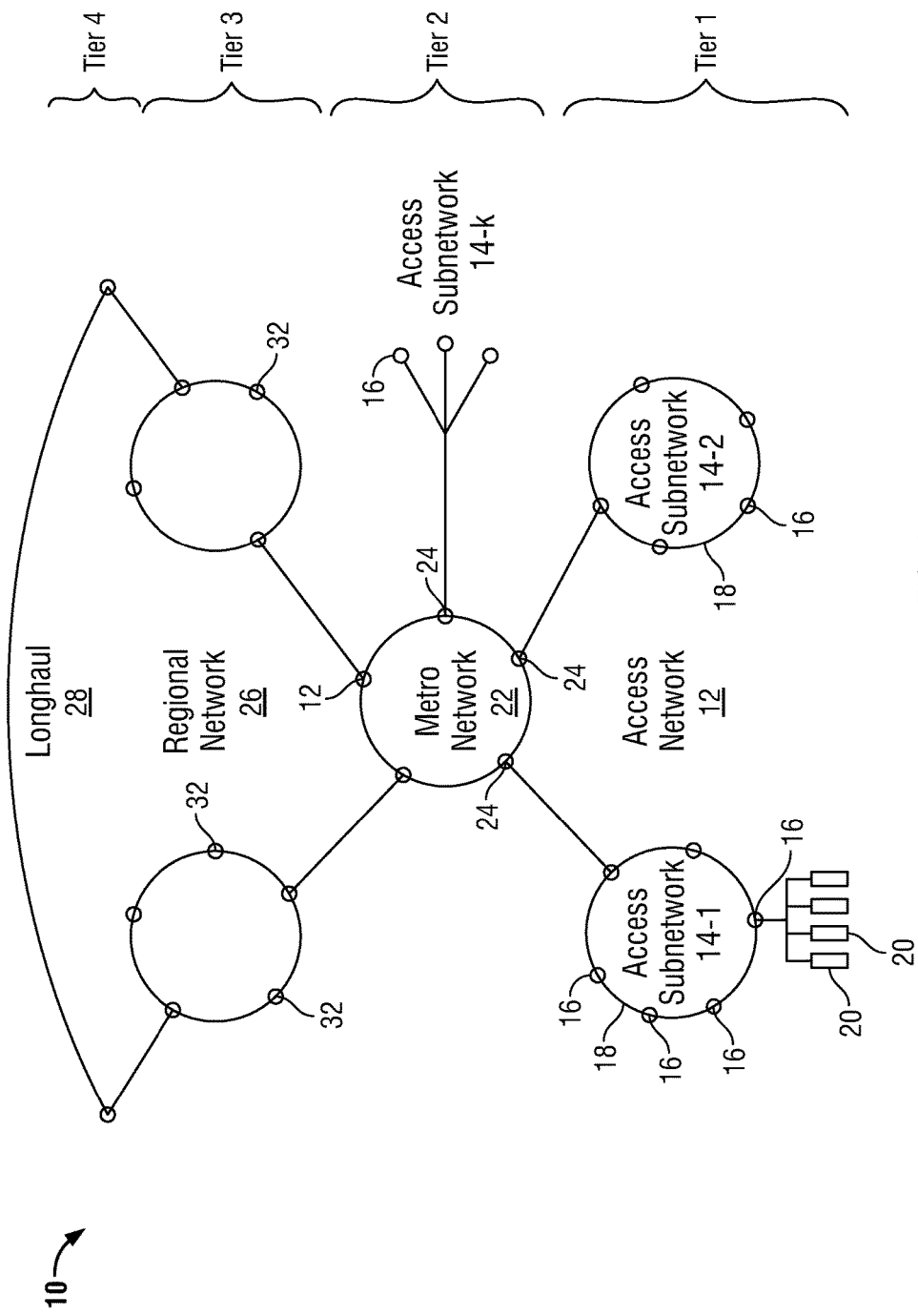
FIG. 1 illustrates one example of a tiered architecture for optical communication or transmission networks that may be configured to transport wavelength division multiplexing (WDM) traffic in accordance with the subject matter described herein.

FIG. 1 illustrates one example of a tiered architecture 10 for optical communication or transmission networks that may be configured to transport wavelength division multiplexing (WDM) traffic in accordance with the subject matter described herein. Depending on the implementation, the tiered architecture 10 may include additional, fewer, or a different configuration of optical networks and optical interconnections than those illustrated in FIG. 1. Within the tiered architecture 10, the lowest tier shown, tier 1, includes one or more access networks 12 that each may include one or more access sub-networks 14-1, 14-2, . . . 14-K. Each access sub-network 14-N includes access nodes 16 interconnected via optical fiber 18 in a ring structure, a tree structure, a bus structure, a mesh structure, or any combination thereof.

In general, each access node 16 is communicatively coupled to one or more access points 20, such as remote office buildings, residential areas, etc. Deployed at each access point 20 are one or more optical modules such as optical network units (ONUs), for example.

Communicatively coupled to one or more of the access points 20, an access node 16 aggregates the wavelength channels on which those access points 20 transmit uplink traffic and places the aggregated wavelength channels onto the access sub-network 14-N it forms. Similarly, the access node 16 drops from the access sub-network 14-N the wavelength channels on which downlink traffic is transmitted to access points 20.

The access network 12 in turn terminates (e.g., converts the optical access network signal to an electrical signal and then bundles it with other access signals going to the same metro node and then puts them on a metro network optical channel) and aggregates uplink WDM traffic from the network and places that aggregated traffic onto a higher-tiered network such as a metro network 22 at tier 2. The metro network 22 is formed from a plurality of interconnected network nodes 24, sometimes referred to as central offices (COs), and transports WDM traffic for the plurality of access networks. In this regard, each network node 24 aggregates WDM traffic from one or more access networks to which it is connected and transports that aggregated traffic to a hub node 12 in the metro network 22.

The hub node 12 in turn routes wavelength channels from one or more network nodes 24 to a higher-tiered network that may be referred to as a regional network 26. More specifically, the hub node 100 routes wavelength channels to an appropriate one of multiple service-side nodes (not shown), e.g., a business services edge router, a residential services or mobile services broadband network gateway (BNG), a broadband remote access server (BRAS), etc. The service-side node then routes uplink traffic from the wavelength channels towards an appropriate destination, such as to content servicers, back towards the access networks, to the Internet, etc. Such service side node routing may entail sending the uplink traffic to the regional network. The regional network 26 is also formed from a plurality of interconnected network nodes 32, which place the uplink traffic onto a long haul network 28 at tier 4, for inter-regional transport. Downlink traffic propagates through the networks in an analogous, but opposite, manner.

Various ones of the optical system nodes shown in the optical communication or transmission networks of FIG. 1, such as network nodes 24 and network nodes 32 may incorporate reconfigurable optical add/drop multiplexers (ROADMs), which are all-optical subsystems that enable remote configuration of wavelengths. The ROADMs, which generally employ components such as wavelength selective switches, splitters and demultiplexers, allow traffic (i.e., channels or wavelengths) to be added, dropped or express-routed through the nodes.

Figure 2:
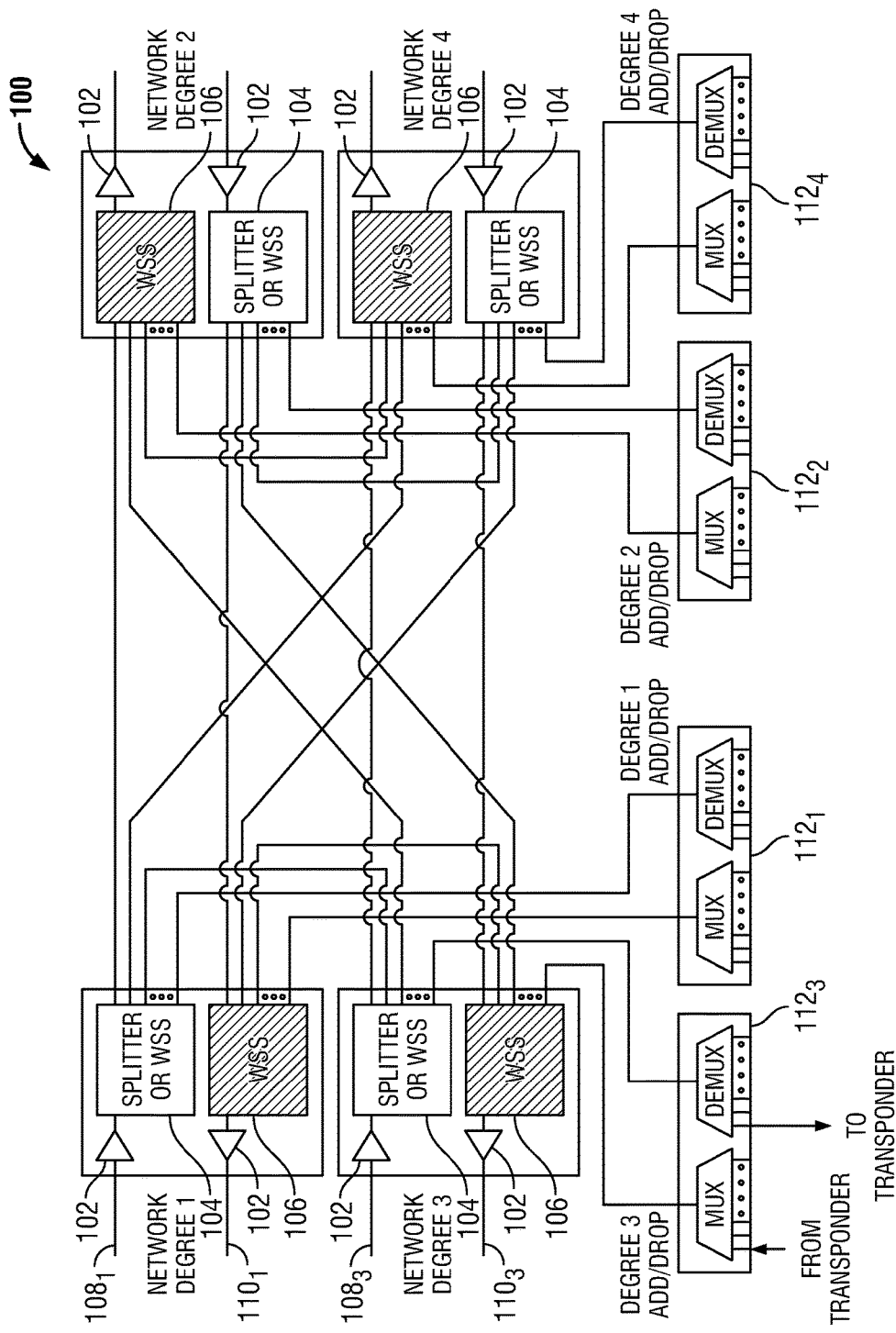
FIG. 2 shows one example of an optical system node.

One illustrative example of an optical system node that may be employed as one or more of the access nodes 16, network nodes 24 and/or network nodes 32 is illustrated in FIG. 2. Of course, the subject matter described herein may be employed with a wide variety of different optical system nodes and is not limited to the particular example presented in FIG. 2.

FIG. 2 is a schematic diagram of one illustrative example of a multi-degree ROADM-based optical system node 100 (four network degrees are shown). Each network degree is coupled to a pair of optical amplifiers 102, with an input connected to a 1×N optical fan-in device, e.g., a power splitter (PS) or wavelength selective switch (WSS) 104), and an output connected to a N×1 optical fan-out device, i.e., WSS 106. Multiplexed optical signals on input port $108_1$ from network degree 1 are selectively directed via PS/WSS 104 to WSSs 106 and associated output ports $110_2$, $110_3$ and/or $110_4$ for network degrees 2, 3 and/or 4, respectively. In the same manner, multiplexed optical signals on input ports $108_2$, $108_3$ and $108_4$ (network degrees 2, 3 and 4) may be similarly routed to the other network degrees of the system. The input ports 108 and output ports 110 serve as the line ports of the optical system node 100. A plurality of multiplexer/demultiplexer assemblies $112_1$, $112_2$, $112_3$, and $112_4$ are connected to the WSSs 106 and PS/WSSs 104 for locally adding/dropping wavelengths from client side ports to/from each network degree 1, 2, 3 and 4 by WSSs 106 and PC/WSSs 104.

Figure 3A:
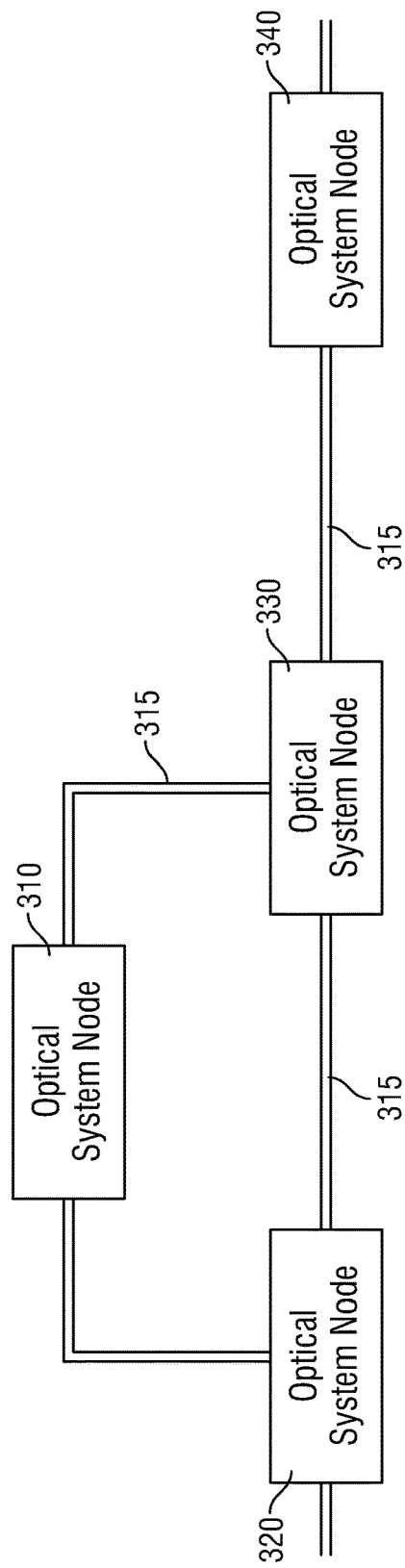
FIG. 3a shows a conventional optical communication or transmission system having a series of optical system nodes connected to the outside fiber plant.

FIG. 3a shows a series of optical system nodes 310, 320, 330 and 340 employed in a conventional optical network such as any of the networks shown in FIG. 1, for example. As noted above, the optical system nodes each include one or more client side ports or interfaces for transporting client signals from the client side to the node and one or more fiber plant or line side ports or interfaces for transporting signals from the node to the fiber plant or line side of an optical network over optical fiber pairs 315. The optical system nodes communicate with one another over the fiber plant of the optical network.

In conventional systems, each respective system is connected to a fixed set of line side fibers. These are hardwired physical connections that need to be broken and reconnected manually in order to change the connections. While ROADM systems enable the optical signals within that system to be flexibly switched to the various fibers connected to that system, they cannot change the physical fibers and their connections to the system. Furthermore, each system within a network tier and across network tiers can only exchange signals (move signals between systems) by terminating the signal and sending through a client side interface. This effectively locks up the fiber plant connected to each system such that only the signals of each respective system can be transported over the respective fiber plant.

Often for maintenance operations, disaster response, or just flexible service provisioning, one would like to be able to modify the fiber plant connections. For example if the fiber connected to a particular system is cut, then the system will need to be attached to a new fiber plant. A node or office typically has many fibers—hundreds or even thousands—going in and out, but each system can only use the fibers that it is connected to. The systems and techniques described herein address this problem by using a line side space switch and providing critical signal monitoring, control, and conditioning elements to enable flexible switching of the fiber plant connecting different systems. Furthermore, these systems and techniques not only enable different systems to share and make use of all of the line side fiber plant available at a node or office, but they also enable systems of different types and within different network tiers to share fiber plant. Thus, signals from a PON access system, for example, can be transmitted over a fiber plant that is used by a ROADM metro system. Furthermore, these connections can be changed programmatically and remotely without physical and manual intervention.

Figure 3B:
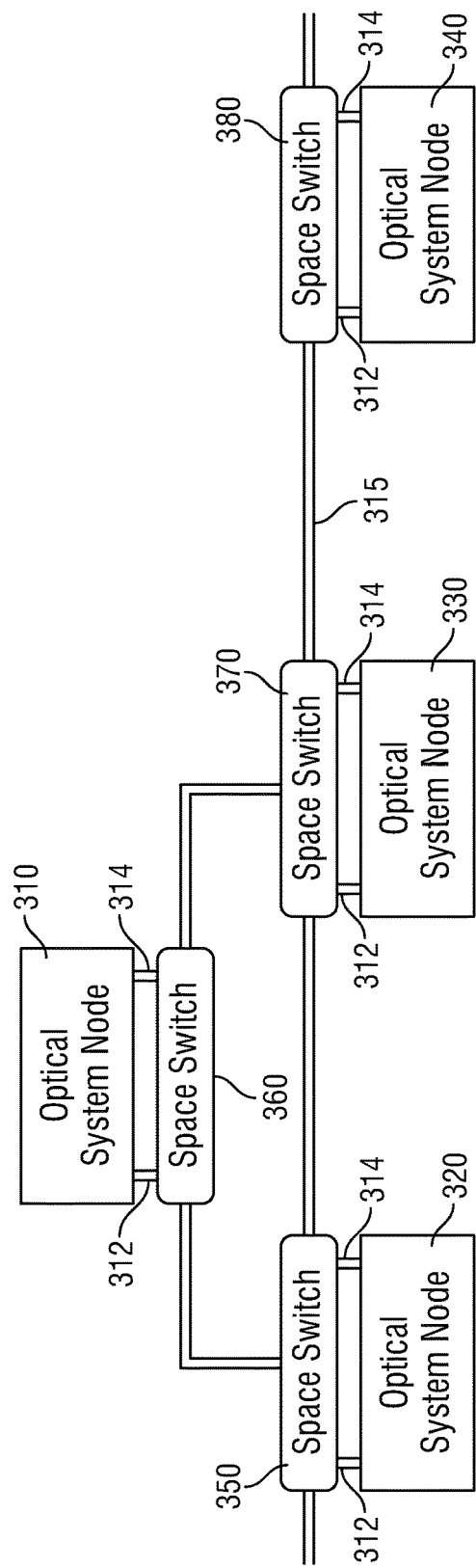
FIG. 3b shows one illustrative implementation of a reconfigurable optical communication or transmission system that incorporates optical space switches between the optical system nodes and the fiber plant.

FIG. 3b shows one illustrative implementation of the optical system nodes 310, 320, 330 and 340 shown in FIG. 3a, which are employed in a reconfigurable optical communication or transmission system that incorporates optical space switches between the optical system nodes and the fiber plant. In particular, optical space switch 360 is associated with optical system node 310, optical space switch 350 is associated with optical system node 320, optical space switch 370 is associated with optical system node 330 and optical space switch 380 is associated with optical system node 340. Each optical system node 310, 320, 330 and 340 has a line side with optical input ports 312 and output ports 314 that pass through the respective optical space switch with which it is associated to connect to the outside fiber plant. The optical space switches allow optical signals to be routed from any line-side input fiber to any selected line-side output fiber.

Figure 4:
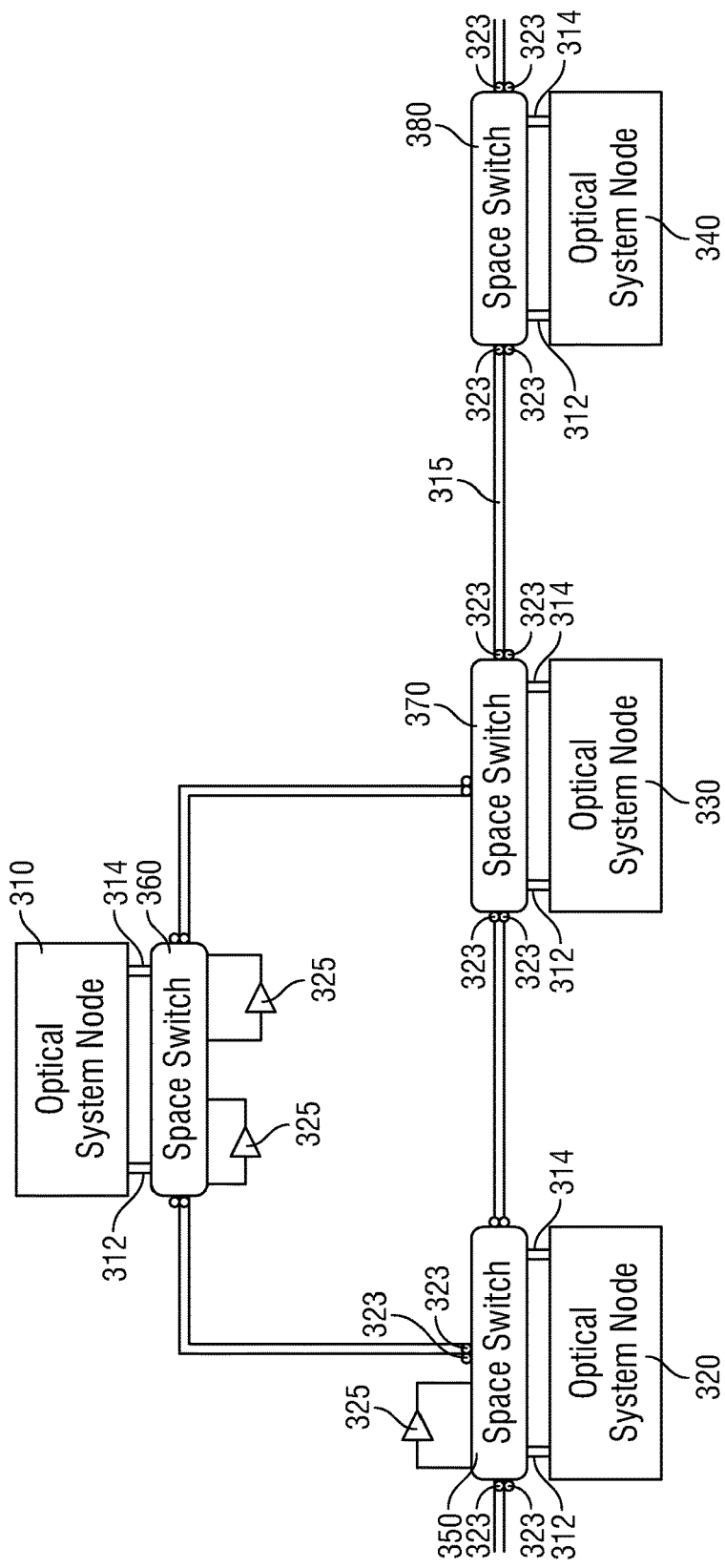
FIG. 4 shows another illustrative implementation of a reconfigurable optical communication system that incorporates functional modules in addition to the optical space switches.

When the outside fiber plant connections are reconfigured, the optical losses and channel configurations change from their target values. To compensate for these changes as needed, some implementations may introduce functional modules that are connected to the space switches. A functional module is a device that is connected to an optical space switch and which may be selectively switched into the optical signal path by the optical space switch in order to perform signal conditioning and/or signal monitoring. FIG. 4 shows another illustrative implementation of a reconfigurable optical communication system that incorporates functional modules in addition to the optical space switches. In FIGS. 3 and 4, as well as the figures that follow, like elements are denoted by like reference numerals.

As shown in FIG. 4, one particular example of a functional module is an optical amplifier 325 and the signal conditioning that it performs is optical amplification for providing additional gain or power to the signals. Other types of functional modules that may be employed are optical power controls 323 which, as shown in FIG. 4, may be connected to the input and/or output of one or more of the space switches 350, 360, 370 and 380 on the fiber plant or line side. The optical power controllers measure the optical power and adjust the optical power to a target value. One implementation of such a monitor is a photodetector that receives a tapped copy of the signals on a fiber going to the outside fiber plant. Another implementation of an optical power controller is a variable optical attenuator, which may be connected to the output of the space switch before the outside fiber plant connection and before the monitor connection. Such optical power controllers may be used with optical amplifiers.

In some implementations optical power monitors and controls incorporated into the optical amplifiers 325 may be used to perform the same functions as the aforementioned optical power controllers 323. Furthermore the optical amplifier monitors and controls, including gain and output power controls, can be used in different combinations with the optical monitors and controllers built into the space switch or attached to other ports of the space switch.

When a network reconfiguration takes place, the optical space switches may be adjusted to entirely bypass the optical system node and/or pass the signals through a functional module attached to the space switch. The optical power controls are used to maintain the optical power levels on the fiber plant at their target values.

Optical power levels at the input and/or output of each fiber in the fiber plant may be measured during typical operating conditions. For example, measurements may be updated at regular (e.g. one hour) intervals when the system is in a stable, non-alarmed or failed state. The target value may also be updated whenever a planned change is made to the system and stable operation is achieved. When the fiber plant is reconfigured, the input and/or output of the fiber plant signal power is controlled to match the last known target operating power determined for the set of channels being moved. Accomplishing this, the underlying optical system will perform its usual transient or optical power control response to provide further fine tuning and adjustments to the channels.

Figure 5:
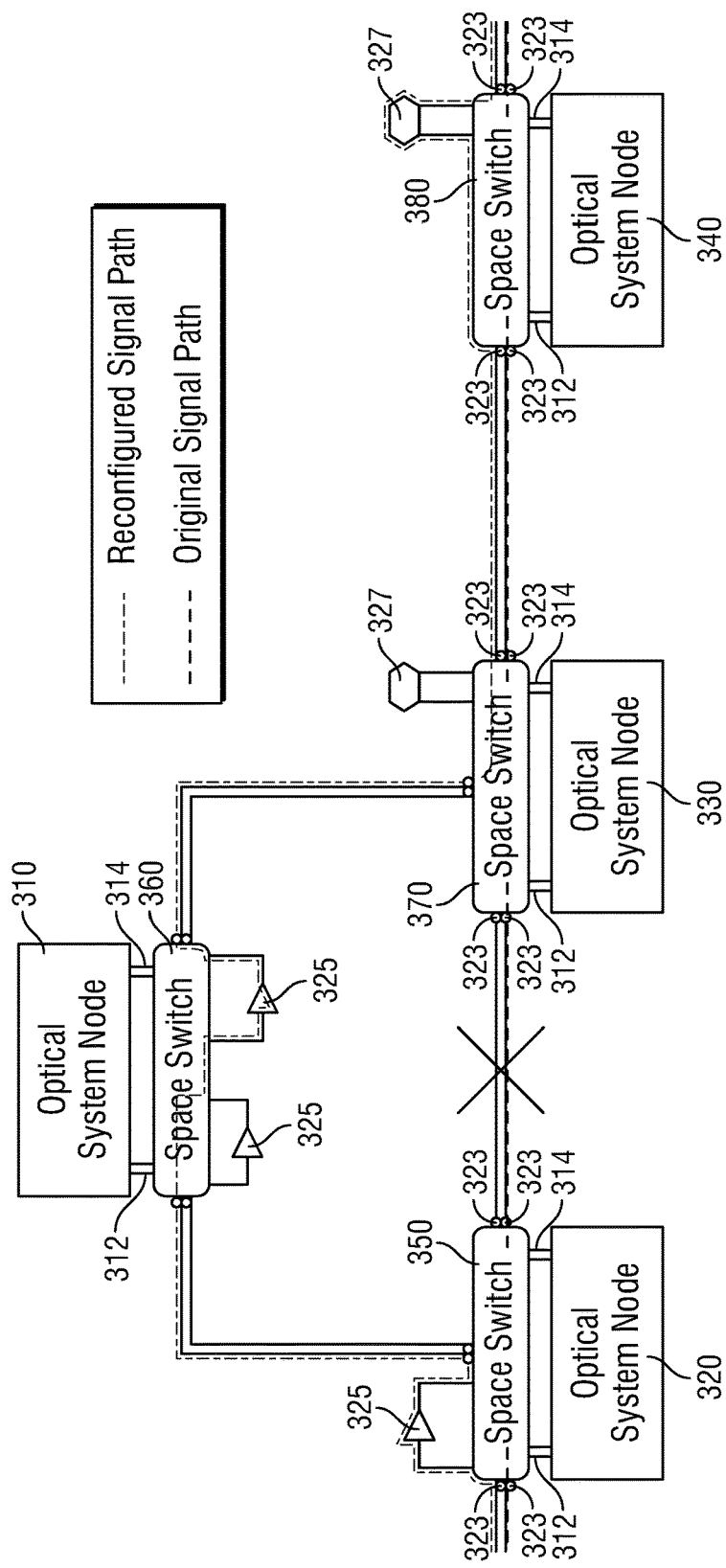
FIG. 5 shows the reconfigurable optical communication or transmission system of FIG. 4 after a fiber break.

FIG. 5 shows the reconfigurable optical communication or transmission system of FIG. 4 after a fiber break between optical system nodes 320 and 330. In this example the original signal path (dashed-dotted line) is reconfigured to a signal path (dashed line) through the upper optical system node 310. The reconfigured path can use fiber already configured for other channels if the reconfigured channels take precedence. Once the signals are back on their original path the signals will be added and dropped as originally configured with the exception that signal quality monitors 327 or optical power monitors may be used to provide information to the system for control.

In some implementations the optical power levels at the input and/or output of one or more fibers involved in the switch reconfiguration are continuously adjusted for some period of time following the reconfiguration. This adjustment may be carried out based upon feedback from one or more signal quality monitors 327 located downstream from the optical system node at which the switch reconfiguration is made. The signal quality monitor 327 may be an optical performance monitor that is introduced at a space switch downstream from the fiber break (see FIG. 5).

In some implementations, the signal quality monitor 327 may obtain forward error correction (FEC) input error readings (pre-FEC or pre correction errors) using a receiver to detect one of the reconfigured channels. The receiver may be located downstream from where the channels were reconfigured. In some cases this power adjustment based on measurement of a downstream signal quality parameter may use a power control algorithm based on the signal quality parameter. The power control adjustments may be limited to a specified range to account for minimum and/or maximum allowed power levels, attenuation levels, or gain levels. The power control algorithm may also use a derivative free optimization algorithm.

In addition to changing the fiber configuration to realize different signal connection paths, signal combining, splitting, and blocking functional modules can be introduced at an optical system node through the space switch in order to combine or split signals from different input and output ports or add and drop ports of the node.

The principles of the reconfigurable techniques described herein may be used to connect optical system nodes from two different underlying communication systems and to send the signals from one system along a path that was formerly used by another system. This functionality can be used when the signals from one system take precedence, for example, in an emergency situation in which the reconfigured signals are used by emergency response teams.

In another example, the principles of the reconfigurable techniques described herein may be used to change the fiber connections based on information related to the electrical power grid. For instance, in a disaster scenario the fiber connections can be reconfigured to provide the maximum capacity based on the available electrical power in the region at different nodes in the network. Moreover, this fiber reconfiguration may be based on algorithms that predict electrical power failure cascades.

Figure 6:
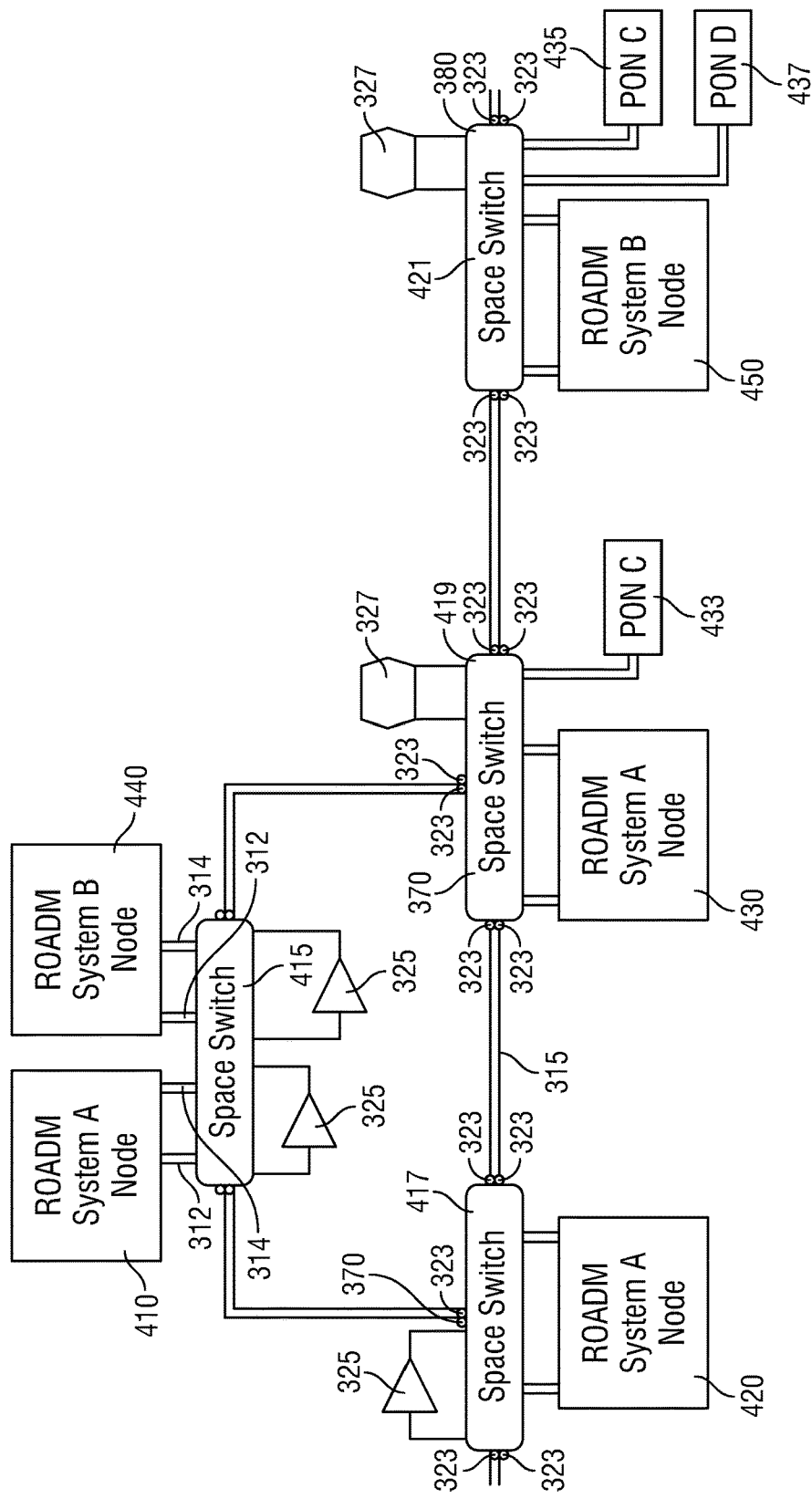
FIG. 6 shows another illustrative implementation of a reconfigurable optical communication system that includes optical system nodes from different types of networks.

In accordance with one aspect of the invention, the optical system nodes may include nodes from different types of networks, such as ROADM networks and access networks. For example, FIG. 6 shows optical system nodes 410, 420 and 430, which are ROADM-based system nodes associated with system A and other optical system nodes 440 and 450, which are ROADM-based system nodes associated with system B. Examples of access networks include passive optical networks (PONs) (e.g., PONs 433, 435 and 437) or point to point networks. In a PON network each node has a single output signal that is split into N copies that are sent to N different end users or fiber to the curb nodes (nodes that terminate the optical signal prior to reaching the end user—converting the signal to an electrical signal or wireless signal to send it to the end user).

Figure 7:
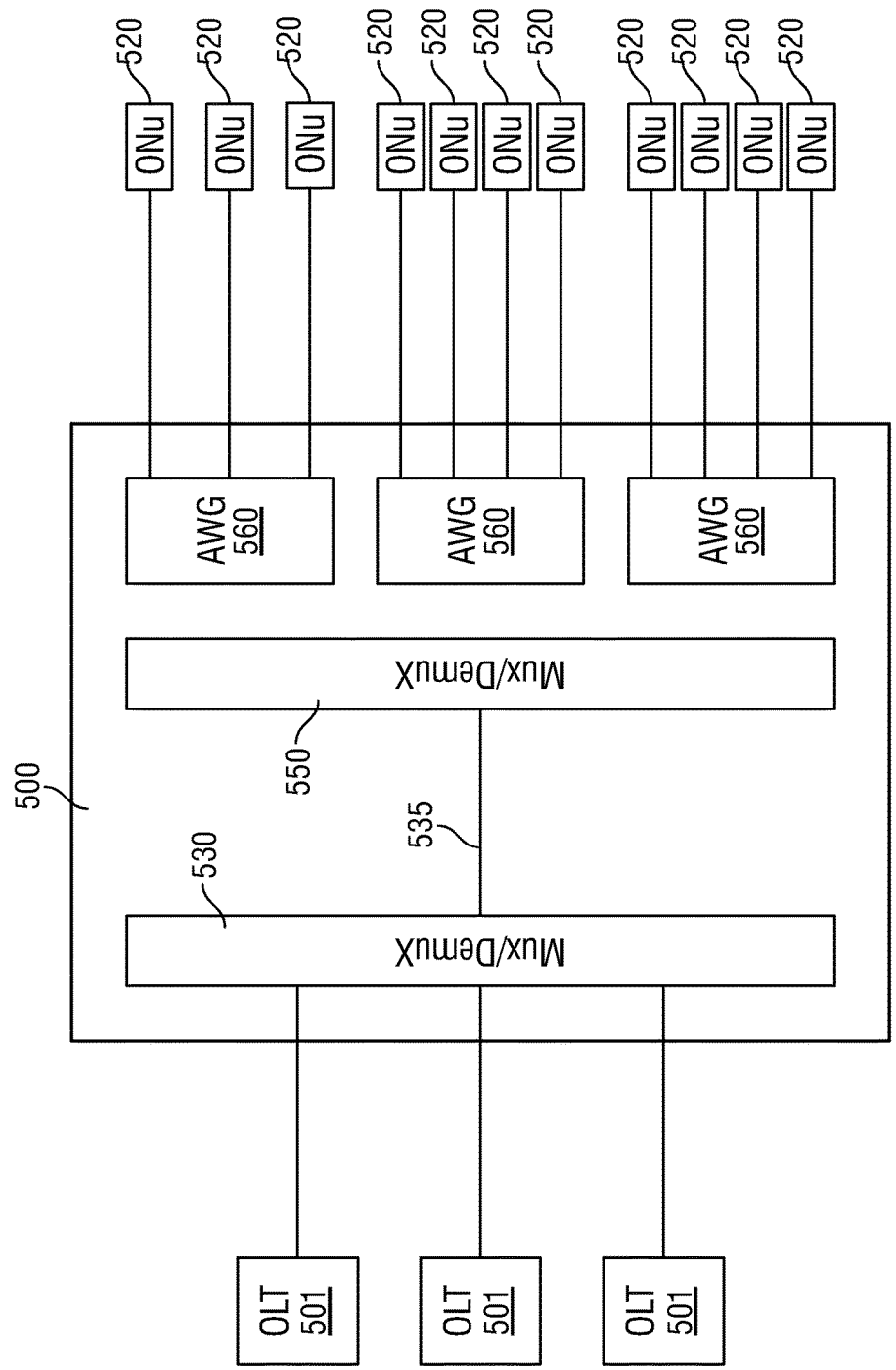
FIG. 7 shows one example of an optical system node that may be employed in a WDM passive optical network (PON).

In the simplest case the optical system node in a PON network includes fan-out devices such as one or more passive splitters or a cascaded series of passive splitters. In a more complex type of PON, such as a WDM PON, for example, the optical system nodes may employ additional passive optical components. For instance, FIG. 7 shows an optical system node 500 in a WDM PON that provides connectivity between upstream optical line terminals (OLTs) 510 operated by the network service provider and downstream optical network units (ONUs) 520, which are service interfaces to end users. The optical system node 500 includes two sets of multiplexers/de-multiplexers (mux/demux) 530 and 550 coupled by optical fiber 535. The mux/demux 530 can be a power splitter, a wavelength splitter, or a combination of both. The mux/demux 550 is coupled to one or more arrayed waveguide gratings (AWGs) 560, and can have a multi-branch optical tree configuration. The mux/demux 550 can be optional in the case that only a single AWG 560 is present. Each AWG 560 multiplexes channels of several wavelengths from end users onto a single optical fiber (upstream) and de-multiplexes signals on the single optical fiber into individual channels of different wavelengths for transmission to end users (downstream).

In one implementation, one or more fiber connections from the ONUs 520 is connected to the optical space switch and the optical space switch in turn is connected to the AWGs 560. Furthermore then mux/demux 550 is connected to the space switch, which is then connected to the OLTs 510. In this way, the WDM PON signals may be reconfigured to different OLTs or even to the ROADM network where they may be transmitted to another central office and terminated at an OLT at an entirely different central office. This functionality might be used in the event of a disaster or component failure that reduces the availability of the OLT at the nearest node. It could also be used for maintenance operations or network upgrades that might require temporarily moving connections to other nodes.

In an access network that is point to point, N line side signals are connected from the access network node to N different end users or fiber to the curb nodes. When employing the techniques described herein, all of the access network line side fibers coming into the access node are first connected to the optical space switch (e.g., optical space switch 415 in FIG. 6) and then the optical space switch is connected to the optical access network line side ports.

Optical fibers from the line side access networks can be connected directly to the line side ports of the ROADM-based system nodes, bypassing the optical access nodes. Thus, optical signals on the access network can be communicated between the access nodes or the ROADM-based nodes depending on the communication requirements. Likewise, optical fibers that are part of the access network can be used by signals from the ROADM network and vice-versa. In particular, optical access network fibers that connect to either end users or to other network nodes can be used by the ROADM network by switching the connections with the optical space switch. In this was the access fibers can be used to form high capacity access trunks or as back up paths for the ROADM network.

Figure 8:
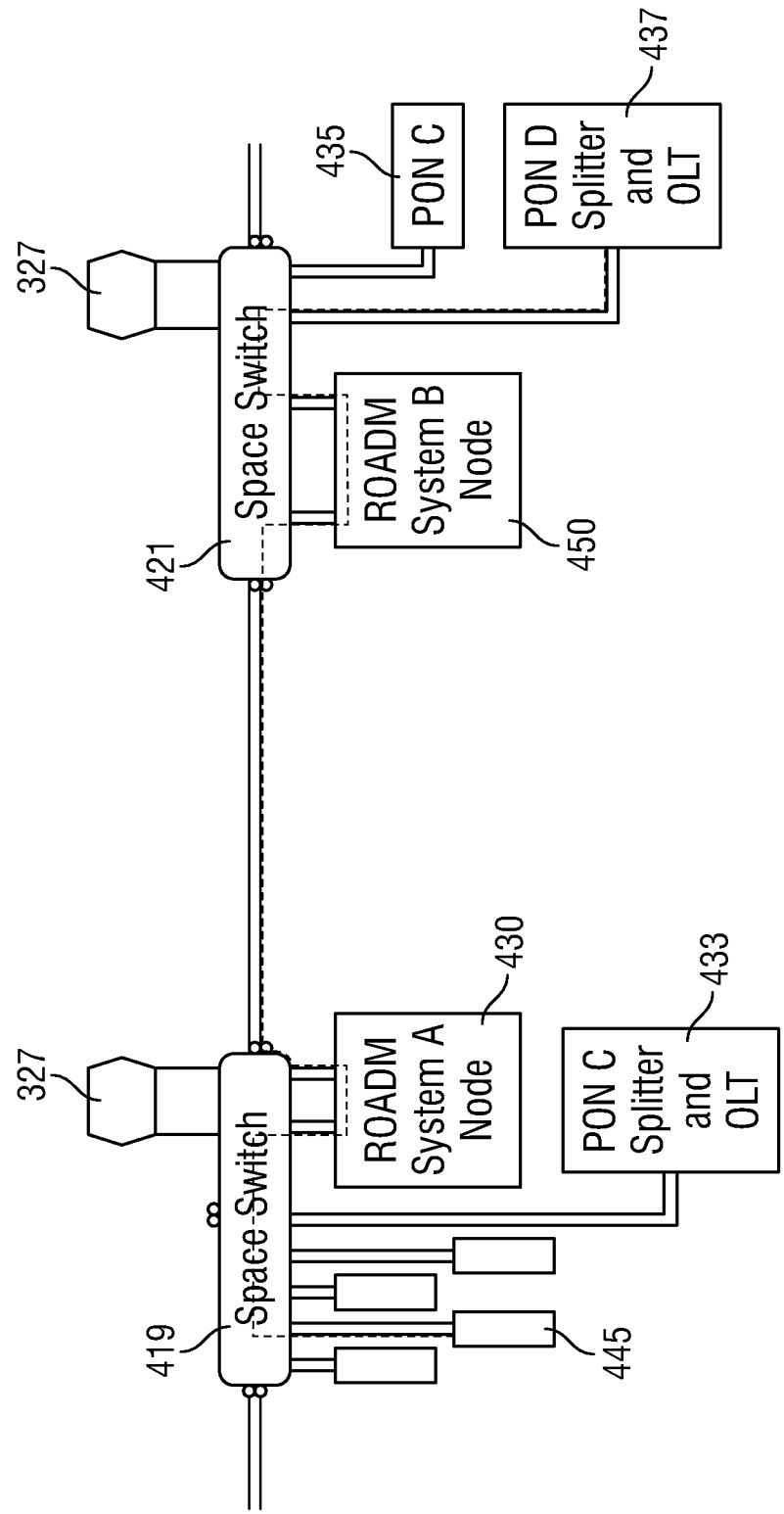
FIG. 8 shows two optical system nodes associated with different optical systems switching a signal from a passive optical network (PON).

FIG. 8 shows the optical system nodes 430 and 450 of FIG. 6, which are associated with systems A and B, respectively. In this example PON signals from an ONU 445 that was to be sent to the OLT of PON 433 is switched to the optical system node 430 of system A for filtering and transmission to the neighboring node 450 of system B, where it is dropped to the OLT of PON 437. The ROADM-based nodes in systems A and B treat the PON signal as a through channel and filtering in the ROADM's WSSs prevents it from interfering with other WDM channels. Alternatively, the PON signal could be switched to a free fiber between the nodes and simply transmitted directly to the next node. That is, the free fiber is independent of the ROADM-based systems and signals traversing this fiber do not undergo amplification or other processing. This may be useful, for example, if the wavelength of the PON signal is not compatible with the ROADM system and it does not require amplification to reach the next node.

It should be noted that the fiber connections described herein can be any combination of uni-directional single fiber connections, bi-directional single fiber connections or, as shown in FIGS. 3-6, bi-directional dual fiber connections, for example.

The optical space switches described herein may employ any suitable technology that allows different optical signals to be routed from an input port to different selected output ports along different paths through the switch. Illustrative all-optical switching technologies that may be employed include, without limitation, opto-mechanical switching technologies, optical microelectromechanical (MEMs) switching technologies, electro-optical switching technologies, thermo-optical switching technologies, liquid crystal switching technologies, bubble switching technologies, acousto-optical switching technologies and semiconductor optical amplifier switching technologies.

Briefly, opto-mechanical-switching may be performed by prisms, moving fibers, and mirrors. Optical MEMs switching may be performed mechanically, optically and electronically. MEMS-based switches may be two-dimensional (2D) or three-dimensional (3D) devices. In 2D MEMS switches, every mirror has two possible states corresponding to two different positions (either on or off). In 3D MEMS-based switches there is a dedicated movable mirror for each input and output port. Electro-optic-switching may be performed by applying a voltage to the substrate, thus changing the substrate's index of refraction. Thermo-optic-switching may be performed by varying a material's temperature to produce changes in its index of refraction. Liquid crystal-based switching may be performed by applying an electric field to re-orientate liquid crystal molecules within a material to change the polarization of the incident beam. Bubble-switching may be performed by the heating and cooling of a substrate containing a liquid. The bubbles deflect light to the output ports. Acousto-optic-switching may be performed by the interaction of light and sound or vibrational waves in a material, which causes orthogonally polarized components of the light to be interchanged with one another. Semiconductor optical amplifier switching may be performed by applying a voltage to a semiconductor material, changing it from light absorbing to transparent or even light amplifying, thereby achieving an on-off functionality.

Figure 9:
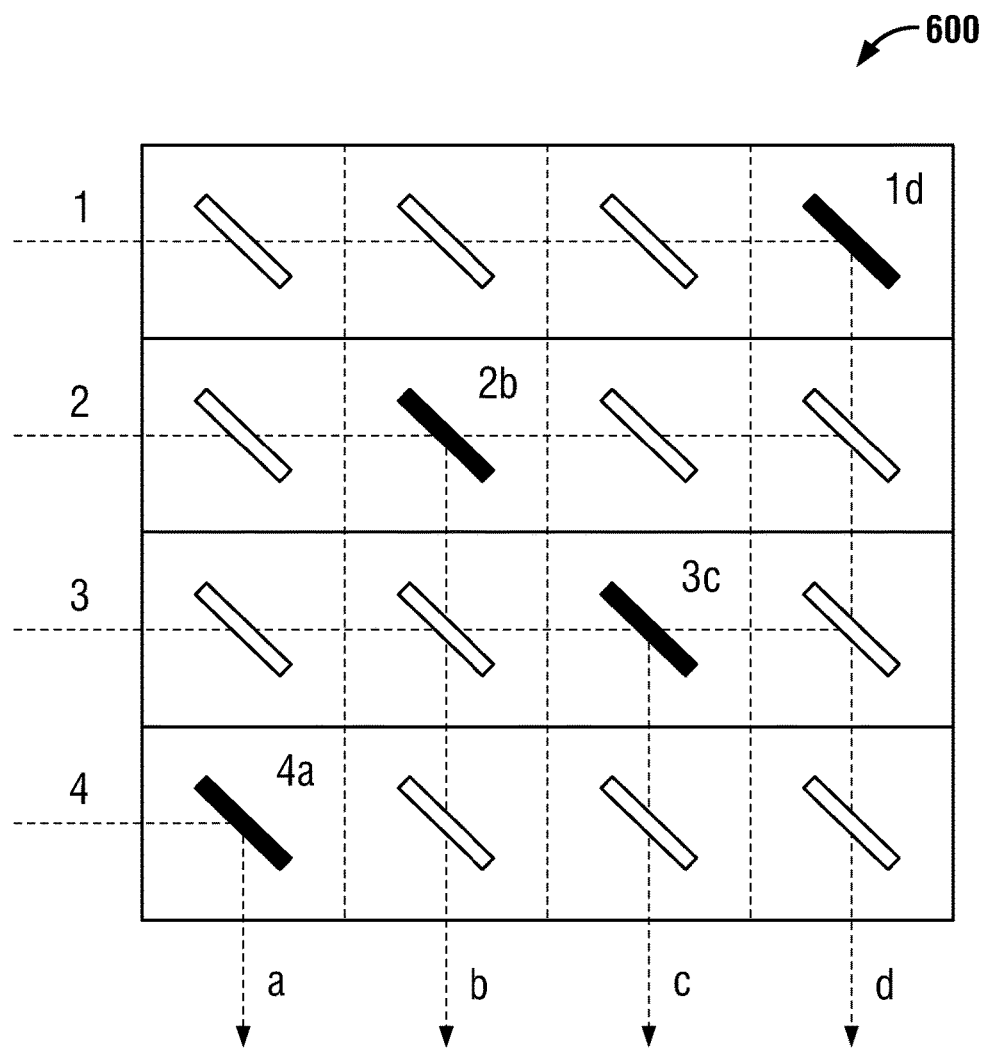
FIG. 9 shows one example of an all-optical 2D MEMs-based optical space switch.

FIG. 9 shows one example of a 2D MEMs-based optical space switch that uses a simple crossbar switching architecture. Input ports and output ports are labeled from 1-4 and a-d, respectively. The individual mirrors of MEMs device 600 may be denoted by their row and column position. A mirror ij in the on state reflects an optical signal from input port i to output port j. In the example of FIG. 9 mirrors 1d, 2b, 3c and 4a are in the on state. Thus, optical signals from input ports 1, 2, 3 and 4 are shown being switched to output ports d, b, c and a, respectively. While the 2D MEMs based optical switch illustrated in FIG. 9 employs a cross-bar switching architecture, it should be noted that in the alternative more complex switching architectures may be employed as well.

In the discussion above the optical system nodes shown in FIGS. 2-6 are said to have both one or more client side ports for transporting client side signals and one or more line side ports for transporting line side signals. The optical system nodes generally perform various types of signal processing to transform the signals from client side signals to line side signals and vice versa. Such signal processing may transform the signals between various protocols that are employed by the client side signals and protocols employed by the line side signals. By way of example and not as a limitation on the subject matter described herein an illustrative signal processing method will be presented that may be used in some implementations to transform client side signals to line side signals. Of course, different types of optical system nodes in different types of optical networks may perform different types of signal processing and the techniques described herein are not to be construed as limiting the subject matter described herein.

The client side can transport client signals that conform to protocols such as Synchronous Optical Network (SONET), Synchronous Digital Hierarchy (SDH), Asynchronous Transfer Mode (ATM), Optical Transport Network (OTN), Ethernet, Internet Protocol (IP), Multi-Protocol Label Switching (MPLS), Storage protocols (e.g. Fiber Channel (FC)), Enterprise Systems Connect (ESCON), Fiber Connectivity (FICON), digital video transport, or a combination thereof as examples. The client side can operate at any transmission rate including 8 gigabits per second (Gbps), 10 Gbps, 40 Gbps, and 100 Gbps, as examples. In some cases the client side signal for one network tier will be the line side signal for the next network tier. In other cases the client side signal of one tier will be a short reach interface that connects to the client side signal of the next tier and the line side signals are entirely separate from the client side signals.

The line side can operate at any transmission rate including the transmission rates of Optical Transport Unit (OTU), OTUk, OTUkV, OTUkeV, and OTUkfV where k can include 1, 2, 3, and 4 as examples for indicating the supported bit rate.

In one example of a sequence of steps that may be performed to transform client side signals to line side signals after the client side signals are received by the optical system node. The incoming data incorporated in the client side signals are transparently mapped to another form of data without regard to the incoming data partition. This mapping process may include transcoding of the data. Next, the client side signals may be asynchronously mapped to an asynchronous mapped frame. Among other things, the asynchronous mapping can decouple the client timing from the line timing. After undergoing asynchronous mapping, an error correction redundancy may be generated for the asynchronous mapped frame. Finally, an output frame is generated that includes the client data, overhead (e.g., information related to operation administration and maintenance functions) and redundancy. A similar process may be performed in reverse to transform line side signals to client side signals. The line side optical space switch may also be configured to switch the line side signals to a suitable electronic service switch in order to convert them to the appropriate client side signal format. By connecting specific client side ports to the optical space switch, these signals may then be re-introduced to the line side for transmission over another network tier to be connected to another system or network at that node.

The configuration of the optical system nodes and their associated optical space switches may be controlled locally at the site of the nodes or remotely (e.g., at a central office or the like). For this purpose one or more controllers or processors may be employed for processing computer executable instructions to control their operation. The computer executable instructions may be provided using any computer-readable storage media, such as a memory of any suitable type.

As user herein, the term "memory" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures, which highlight the functionality and advantages of the present invention, are presented for illustrative purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

The invention claimed is:

1. An optical communication system, comprising:
   a plurality of optical system nodes that each includes at least one reconfigurable optical add/drop multiplexer (ROADM), the optical system nodes each having at least one client side port and at least one line side port;
   a plurality of optical space switches, each optical space switch being operatively coupled to the line side port of one of the plurality of optical system nodes; and
   a plurality of optical fibers, each of the optical fibers coupling one of the optical space switches to another of the optical space switches.

2. The optical communication system of claim 1 wherein at least one of the optical space switches includes at least one functional module that is selectively switchable by the optical space switch into a signal path traversing the optical space switch, the at least one functional module being configured to perform signal conditioning and/or signal monitoring.

3. The optical communication system of claim 2 wherein the functional module includes at least one optical amplifier.

4. The optical communication system of claim 1 wherein at least one of the optical space switches includes at least one optical controller disposed in the signal path traversing the optical space switch.

5. The optical communication system of claim 4 wherein the optical controller is disposed at an input to the optical space switch.

6. The optical communication system of claim 4 wherein the optical controller is disposed at an output to the optical space switch.

7. The optical communication system of claim 4 wherein the optical controller includes first and second optical controllers, the first optical controller being disposed at an input to the optical space switch and the second optical controller being disposed at an output to the optical space switch.

8. The optical communication system of claim 4 wherein the optical controller includes an optical power controller.

9. The optical communication system of claim 8 wherein the optical power controller includes a variable optical attenuator.

10. The optical communication system of claim 4 wherein the optical controller includes an optical power monitor.

11. The optical communication system of claim 1 wherein at least one fiber connection from the optical communication system is connected to at least one line side port of a different optical communication system using the optical space switches.

12. The optical communication system of claim 1 wherein at least one fiber connection between nodes in the optical communication system is reconfigured using one or more of the optical space switches such that it becomes a fiber connection connecting nodes of a different optical communication system.

13. The optical communication system of claim 1 further comprising an optical access network node with a plurality of line side ports and at least one additional optical space switch associated with the optical access network node, the plurality of line side ports being connected through the additional optical space switch to a plurality of line side fibers that terminate at end user sites or fiber to the curb end terminations.

14. The optical communication system of claim 13 wherein at least one optical signal from at least one access network line side fiber is connected directly to at least one line side port of a ROADM system node to thereby bypass the optical access system node.

15. The optical communication system of claim 14 wherein at least one optical signal from at least one access network line side fiber is connected directly to at least one add/drop port of a ROADM system node, thereby bypassing the optical access system node.

16. The optical communications system of claim 14 wherein a plurality of line side fibers from an optical access network are connected using the space switches to a functional element that optically combines the signals from the plurality of line side fibers, wherein the optically combined signals are subsequently connected to a line side port of a ROADM system node to thereby bypass the optical access system node.

17. A method of reconfiguring a signal path through an optical communication system that includes a plurality of optically interconnected optical system nodes each having reconfigurable optical add/drop multiplexing functionality, comprising:
  determining that a preconfigured signal path between first and second ones of the optical system nodes is unavailable; and
  upon determining that the preconfigured signal path is unavailable, using a first optical space switch associated with the first optical system node to bypass the first optical system node and redirect optical channels that are to traverse the preconfigured signal path to a third optical space switch associated with a third one of the optical system nodes, the third optical space switch being able to further redirect the optical channels to a second optical space switch associated with the second optical system node.

18. The method of claim 17 further comprising monitoring one or more signal quality parameters of the optical channels and, based on the monitoring, performing signal conditioning on the optical channels.

19. The method of claim 18 wherein the signal quality parameter includes an optical power level and the signal conditioning includes optical amplification and attenuation.

20. The method of claim 19 further comprising comparing the monitored optical power level to a target value and optically amplifying the redirected optical channels if the monitored optical power level is below the target value.

21. The method of claim 18 wherein the monitoring is performed before the optical channels are redirected.

22. The method of claim 20 wherein the monitoring is performed after the optical channels are redirected.

23. The method of claim 17 further comprising performing signal conditioning on the optical channels based on a signal quality parameter being monitored by a signal quality monitor located downstream from the first and second optical system nodes.

24. The method of claim 23 wherein the signal conditioning is optical amplification.

25. The method of claim 18 wherein the signal quality parameter being monitored reflects forward error correction input errors.

26. The method of claim 17 wherein the preconfigured signal path is unavailable because of an optical fiber break arising between the first and second optical signal nodes.

27. The method of claim 17 wherein determining that the preconfigured signal path between the first and second optical system nodes is unavailable includes determining that electrical power is or will be unavailable to the second optical system node or another optical system node downstream from the first optical system node.

28. The method of claim 17 further comprising monitoring an optical power level at an input and/or output of one or more optical fibers optically coupled to the optical space switches.

29. The method of claim 28 further comprising comparing the monitored optical power levels to a target value and adjusting the optical power levels of the redirected optical channels to match a last known target operating power of the redirected optical channels.

30. The method of claim 18 wherein the signal quality parameter is monitored with an optical performance monitor located downstream from the first optical system node.

31. The method of claim 30 wherein performing signal conditioning on the optical channels includes adjusting power level of one or more of the optical channels.

32. The method of claim 26 wherein adjusting the power level of the one or more optical channels is performed using a power control algorithm.

33. The method of claim 32 wherein the power control algorithm includes a derivative free optimization algorithm.

34. The method of claim 31 wherein adjusting the power level of the one or more optical channels is limited to a specified range based at least in part on a minimum and/or maximum allowed power level, an attenuation level or a gain level.

35. The method of claim 18 wherein the signal quality parameter being monitored reflects forward error correction input errors and the monitoring is performed with an optical performance monitor located downstream from the first optical system node.

36. The optical communication system of claim 1 further comprising at least one additional optical fiber coupling one of the optical space switches to another of the optical space switches such that optical signals traversing the additional optical fiber do not traverse the ROADMs included in the optical signal nodes to which the optical space switches are respectively operatively coupled.

37. The optical communication system of claim 13 wherein the optical access node is a passive optical network (PON) node.

38. The optical communication system of claim 37 wherein the PON node is a WDM PON node communicating WDM PON signals through a WDM PON.

* * * * *